United States Patent Office 2,999,885
Patented Sept. 12, 1961

2,999,885
PURIFICATION OF FLUOROCARBONS
Jack W. Heberling, Jr., Wilmington, Del., assignor to E. I. du Pont de Nemours and Company, Wilmington, Del., a corporation of Delaware
No Drawing. Filed Sept. 17, 1959, Ser. No. 840,534
7 Claims. (Cl. 260—648)

This invention relates to the purification of saturated fluorocarbons and particularly to a process for decreasing the amounts of those impurities which are obtained as by-products or as unconverted reactants in the preparation of the saturated fluorocarbons.

The saturated fluorocarbons in the pure state are highly inert, odorless, tasteless and nontoxic gases or liquids at atmospheric pressure and the usual prevailing room temperatures. They are stable to quite high temperatures into to hydrolysis and are inert to acids, alkalis and most reactive chemicals. They are well known to be useful as dielectrics, solvents, heat exchange media and hydraulic liquids. The lower boiling members, boiling below normal atmospheric temperatures, are also well known to be useful as refrigerants and as propellants for a wide variety of materials, that is, as liquefied gases under pressure having dissolved or dispersed therein materials which are to be expelled from containers as sprays or aerosols. Particularly because of their stability, inertness and nontoxicity, the lower boiling members are well adapted for use as propellants for food formulations.

Some of the saturated fluorocarbons, such as octafluorocyclobutane, are prepared by the thermal dimerization of tetrafluoroethylene and other unsaturated fluorocarbons. In such preparations, various saturated halohydrocarbon and unsaturated halocarbon by-products are formed. Such by-products and unconverted reactants are present in the saturated fluorocarbons as impurities or contaminants. While the saturated by-products are essentially nontoxic, their presence in substantial amounts may lead to excessive ionic fluorine development when stored in the presence of food products or otherwise exposed to moisture. The unsaturated fluorocarbon by-products and unconverted reactants are toxic and may also contribute ionic fluorine upon hydrolysis. Neither the saturated nor the unsaturated by-products of fluorocarbon manufacture can be sufficiently reduced by distillation or other physical methods to the low concentrations that may be desired or necessary for many uses. Among the objectionable unsaturated impurities that are frequently present in such unrefined saturated fluorocarbons are perfluoroolefins, such as tetrafluoroethylene ($C_2$), hexafluoropropene ($C_3$), and octafluoroisobutylene ($C_4$).

Many of the saturated fluorocarbons are prepared by the pyrolysis of highly fluorinated compounds which also contains chlorine, or hydrogen, or both. When saturated fluorocarbons are made by such processes, they also contain, in addition to perfluoroolefins, saturated and unsaturated highly fluorinated compounds which contains chlorine, hydrogen, or both chlorine and hydrogen. Such impurities containing chlorine or hydrogen are unstable and reactive, and particularly are subject to hydrolysis whereby they release fluoride ion.

Representative objectionable saturated impurities that are frequently present in saturated fluorocarbons which have been refined solely by distillation are 1,2-dichlorotetrafluoroethane, 1,1,2 - trifluoroethane, 1,1,1,2 - tetrafluoroethane, 2-chloro - 1,1,1,2 - tetrafluoroethane, 2-chloro-1,1,2,2-tetrafluoroethane, pentafluoroethane, 1,1-difluoroethane, and corresponding fluorinated propanes and butanes.

One indication of the presence of the objectionable impurities and the harmful effects thereof, when present as impurities in the saturated perfluorocarbons, is shown by exposing mice to an atmosphere containing the impure saturated fluorocarbons. For example, when mice were exposed for a short time to air containing small amounts of unrefined octafluorocyclobutane containing unsaturated and like impurities produced as by-products in its preparation, they succumbed to severe hemorrhagic pulmonary edema. After purification of the octafluorocyclobutane by treatment in accord with the present invention, no ill effects on mice were observed during exposure to air containing much higher concentrations of the octafluorocyclobutane. A rapid and reliable method for the determination of the objectionable $C_3$ and $C_4$ unsaturated fluorocarbon impurities and their concentration in a saturated fluorocarbon, and thus the suitability of such saturated fluorocarbon for use free of toxic hazards, is a color-forming test and colorimetric analysis which comprises bubbling the impure saturated fluorocarbon through cold methanol, treating the resulting methanol solution of the impurities with pyridine and piperidine to develop color, and then determining the percent of light transmission of the methanol solution. The degree of contamination of a saturated fluorocarbon by such objectionable impurities and the effect of a given treatment for the purification thereof may also be determined by mass spectroscopy and by high resolution gas chromatography.

Such impurities, particularly the unsaturated compounds, are toxic and constitute a hazard in the handling and use of saturated fluorocarbons containing them, particularly when it is desired to use a saturated fluorocarbon as the propellant for a food formulation. For use as a food propellant, it is essential that the saturated fluorocarbon be safe for human consumption and hence that it be substantially free from any toxic impurities and any impurities which are hydrolytically unstable. That is, the saturated fluorocarbon should contain less than one part per million (p.p.m.) of the toxic impurities, and not over 5 parts per million of hydrolyzable impurities so that, when the purified saturated fluorocarbon is in contact with water, not more than one part per million of fluoride ion will be formed, say, over a period of a year. Such amount of fluoride ion would not be injurious in foods and would not affect the electrical properties of the saturated fluorocarbons in their use as dielectrics or render them objectionally corrosive. Prior to the present invention, the removal of such impurities from the saturated fluorocarbons to the extent necessary to provide products which are reasonably free of toxic hazards, particularly products which are sufficiently safe for use with foodstuffs, has been difficult and not commercially practicable. Some prior processes fail to yield products of the required purity. Other prior processes, are inefficient and require impractically long and costly procedures.

It is an object of this invention to produce a saturated fluorocarbon that is free from harmful amounts of impurities of the character of those obtained as byproducts in the manufacture of the saturated fluorocarbon. Another object is to provide an effective chemical process for decreasing the impurities occurring in unrefined saturated fluorocarbons. A further object is to provide a grade of a saturated fluorocarbon, such as octafluorocyclobutane, that is suitable for use as a propellant for food formulations. Other objects are to advance the art. Still other objects will appear hereinafter.

The above and other objects may be accomplished in accord with this invention which comprises the process for decreasing the impurities in a saturated fluorocarbon of 2 to 6 carbon atoms in which the impurities are highly fluorinated organic compounds obtained as by-products or as unconverted reactants in the preparation of the saturated fluorocarbon and include at least one highly fluorinated unsaturated organic compound, which process comprises intimately contacting the impure saturated fluorocarbon with an aqueous solution of potassium permanganate in a concentration of from about 5% to about 40% by weight which contains from about 0.5 to about 2 parts by weight of an alkali metal hydroxide per part of potassium permanganate, at a temperature of from about 20° C. to about 95° C., employing an amount of the permanganate solution to provide from about 2 to about 6 parts by weight of potassium permanganate for each part of impurity in the saturated fluorocarbon, and separating the purified saturated fluorocarbon from the reaction mixture.

The basic potassium permanganate solution is especially effective in decreasing the objectionable impurities contained in the saturated fluorocarbons to harmless proportions and essentially to a state of nonexistence.

The saturated fluorocarbons, which are to be treated and purified in accord with this invention, are those which contain from 2 to 6 carbon atoms and include the acyclic (open chain) and alicyclic (containing a cyclic carbon ring) compounds. The term "fluorocarbon" is used in its commonly understood sense to mean a compound which consists of carbon and fluorine, i.e., contains no other elements. Also the term "saturated" is employed in the strict sense to mean that adjacent carbons of the compounds are joined solely by single bonds, that is, the compounds do not contain any multiple carbon-carbon bonds. Representative saturated fluorocarbons are: hexafluoroethane, octafluoropropane, decafluorobutane, dodecafluoropentane, tetradecafluorohexane, hexafluorocyclopropane, octafluorocyclobutane, trifluoromethylheptafluorocyclobutane, bis(trifluoromethyl)hexafluorocyclobutane, pentafluoroethylheptafluorocyclobutane, decafluorocyclopentane and dodecafluorocyclohexane. The impure saturated fluorocarbons are those in which the impurities are highly fluorinated organic compounds obtained as by-products or as unconverted reactants in their preparation and include at least one highly fluorinated unsaturated organic compound. They may have been prepared by any known process, such as dimerization, pyrolysis or fluorination processes.

In accord with the process of this invention, the impure saturated fluorocarbons are purified by contacting them with a basic aqueous solution of potassium permanganate. In such solution, the concentration of the potassium permanganate may vary from about 5% to about 40% by weight, i.e., from about 5 to about 65 parts by weight of potassium permanganate per 100 parts of water. When the process is carried out at a temperature above 30° C., it is preferred that the potassium permanganate be in a concentration of about 10% by weight. At lower temperatures (30° C. and below), about a saturated solution of potassium permanganate is preferred.

The potassium permanganate solution will contain from about 0.5 to about 2 parts by weight of an alkali metal hydroxide for each part of potassium permanganate. Usually, the alkali metal hydroxide will be the hydroxide of an alkali metal having an atomic weight between 22 and 40, i.e., sodium hydroxide or potassium hydroxide, preferably sodium hydroxide.

For best results, it will be preferred to include in the potassium permanganate solution from about 0.5% to about 1% by weight, based on the water, of a surface active dispersing agent. Such dispersing agent improves the contact between the impure saturated fluorocarbon and the permanganate solution so that the process is rendered more efficient and the impurities are more completely removed from the saturated fluorocarbon in shorter periods of time. Suitable dispersing agents are the long chain alkyl sodium sulfates, such as the mixtures in which the alkyl groups contain from 12 to 16 carbon atoms, and the sodium alkylarenesulfonates, particularly those containing long chain alkyl groups such as the mixed sodium alkyl benzenesulfonates in which the alkyl groups contain an average of 12 carbon atoms. Such dispersing agents are well known to the art and are readily available commercially. Other conventional surface active dispersing agents may be employed, the particular dispersing agent not being critical to this invention.

Treatment of the saturated fluorocarbon to be purified with the permanganate solution of this invention may be carried out in a continuous gas-liquid phase reactor or, preferably, in a batch liquid-liquid phase reactor.

In a continuous gas-liquid phase reactor, the impure saturated fluorocarbon forms the gas phase while the potassium permanganate solution composes the liquid phase. The gas is bubbled through a packed column, bubble plate column, tower, or similar device arranged and adapted for scrubbing the gas with the potassium permanganate solution or allowing intimate contact between the gas and the liquid. The column or scrubber may be recharged with fresh permanganate solution from time to time, when necessary, or the permanganate solution may be permitted to flow continuously countercurrent to the gas stream and be replenished without interrupting the operation. The usual practical working temperature range for the continuous gas-liquid phase treatment is about 20° C. to about 95° C. The preferred temperature is about 90° C.

When the gas emerges from the continuous gas-liquid phase reactor, it is convenient and economical to pass it directly through a drying tube containing a drying agent such as silica gel, anhydrous calcium sulfate and the like, and then to condense it in preparation for a final fractional distillation.

In the liquid-liquid phase reactor that works with single batches of material at a time, the impure saturated fluorocarbon and the potassium permanganate solution are kept mixed by agitation in a closed vessel, such as an autoclave. Contact of the liquids is maintained for from about one hour to about 48 hours at temperatures from about 20° C. to about 95° C. The preferred temperature is about 90° C. For a saturated fluorocarbon having a boiling point at atmospheric pressure lower than the selected operating temperature, the reaction vessel must be gas-tight and capable of withstanding the generated pressure. The relative amounts of the saturated fluorocarbon and potassium permanganate solution that should be employed in a batch treatment depend upon the amount of impurities to be removed from the saturated fluorocarbon. The reactor charge should include an amount of the permanganate solution which will provide from about 2 to about 6 parts by weight of potassium permanganate for each part of fluoroolefine and other impurities previously determined to be present in the saturated fluorocarbon to be purified. At least about 4 parts of potassium permanganate is usually employed. Larger amounts of permanganate solution may be present without adverse effect.

When the reaction in the liquid-liquid phase reactor is completed, as may be determined by bleeding off a sample of the gas and analyzing it for impurity content, the saturated fluorocarbon is removed from the potassium permanganate solution in any suitable manner. This may be done, for example, by flash evaporation, followed by drying, condensing and distilling the treated saturated fluorocarbon. The separation of the purified saturated fluorocarbon from the permanganate solution may also be accomplished by cooling the reactor and its contents, withdrawing the lower layer of saturated fluorocarbon, and fractionally distilling the withdrawn material to recover the purified saturated fluorocarbon.

The colorimetric analysis for unsaturated fluorocarbons consisted of bubbling a 25 gm. sample of the saturated fluorocarbon at a rate of 0.4 cu. ft. per hour through a 40 ml. impinger flask containing 15 ml. of methanol maintained at −5° C. To the methanol, which now contained the unsaturated fluorocarbons removed from the saturated fluorocarbon, was first added 5 ml. of pyridine and then 5 ml. of piperidine. The mixture was agitated for 15 to 30 seconds and allowed to stand 60 minutes to develop color. The volume was then adjusted to 25 ml. with methanol. The percent transmission of light in 5.0-cm. cells at 420 mu was then determined colorimetrically, and the quantity of unsaturated fluorocarbons present, corresponding to the percent transmission, was read from a calibration curve.

The presence of saturated compounds containing chlorine, hydrogen, or both chlorine and hydrogen in addition to fluorine may be detected by exposing the saturated fluorocarbon containing them to water for extended periods of time and analyzing the water for fluoride ion. A more rapid and a highly sensitive laboratory procedure is to make a quantitative measure of trace amounts of these impurities by high resolution gas chromatography. The procedure employed in the examples below is described by Bennett et al. (Analyt. Chem. 30, 898 (1958)) using a 30-foot column of Chromosorb (Johns-Manville) bearing dibutyl maleate as a liquid absorbent. Trace amounts of tetrafluoroethylene also are determined by this procedure. The $C_3$ and $C_4$ unsaturated fluoroolefins likewise are determined in this way and by the colorimetric procedure already given.

In order to more clearly illustrate this invention, preferred modes of carrying it into effect and the advantageous results obtained thereby, the following examples are given in which the parts and proportions are by weight except where specifically indicated otherwise.

EXAMPLE 1

A 5-gallon gas-tight stainless steel autoclave fitted with an agitator was charged with 8.5 lbs. of unrefined octafluorocyclobutane containing about 31% octafluoroisobutylene, 9.3 lbs. of potassium permanganate, 4.5 lbs. of sodium hydroxide, 0.2 lbs. of sodium alkyl ($C_{12}$ ave.) benzenesulfonate and 16 lbs. of water. The mixture in the autoclave was agitated for 33 hours at 90° C. A sample of gas was withdrawn from the autoclave at the end of this time, dried, and condensed. The condensate was then distilled and the refined product analyzed colorimetrically for $C_3$ and $C_4$ unsaturated fluorocarbons. Less than 0.1 p.p.m. of $C_3$ and $C_4$ unsaturated impurities remained in the octafluorocyclobutane. By the permanganate treatment described, a gross amount of impurities is reduced to a negligible quantity.

EXAMPLE 2

By the procedure given in Example 1, the following purification was effected as determined by high resolution gas chromatography.

*Analysis of octafluorocyclobutane*

|  | Unrefined Starting Material | | Purified Product | |
|---|---|---|---|---|
|  | Vol. Percent | p.p.m. | Vol. Percent | p.p.m. |
| Octafluorocyclobutane | 63.47 |  | 100.00 |  |
| Octafluoroisobutylene | 24.50 |  |  | <1 |
| Trifluoromethylheptafluorocyclobutane | 7.3 |  |  | <1 |
| Trifluoromethane | 2.38 |  |  | <1 |
| 1,1,1,2-Tetrafluoroethane | 0.61 |  |  | <1 |
| 1,1,2-Trifluoroethane | 0.45 |  |  | <1 |
| Decafluorobutane | 0.24 |  | .13 |  |
| 1,2-Dichlorotetrafluoroethane | 0.22 |  |  | <1 |
| 1,1-Difluoroethane |  | 251 |  | <1 |

Colorimetric analysis of the refined product indicated less than 0.1 p.p.m. of octafluoroisobutylene present.

EXAMPLE 3

A 5-gallon autoclave as used in Example 1 was charged with 1.8 lbs. of potassium permanganate, 2.1 lbs. of sodium hydroxide, 0.05 lb. of sodium alkyl($C_{12}$ ave.)- benzenesulfonate, 12 lbs. of water, and 8.6 lbs. of unrefined octafluorocyclobutane containing about 1.2% tetrafluoroethylene, 0.9% hexafluoropropene, and 0.2% perfluoroisobutylene as impurities. The mixture was agitated for 33 hours at 90° C. A sample of octafluorocyclobutane withdrawn from the autoclave after this treatment that was dried, condensed and recovered following a final distillation contained less than 1.0 p.p.m. of toxic impurities (less than 0.1 p.p.m. of $C_3$ and $C_4$ unsaturates) as determined by gas chromatography and colorimetry.

It will be understood that the preceding examples have been given for illustrative purposes solely and that this invention is not limited to the specific embodiments described therein. One the other hand, it will be readily apparent to those skilled in the art that, within the limitations set forth in the general description, many variations and modifications can be made therein, particularly in the proportions, conditions, equipment and techniques employed without departing from the spirit or scope of this invention.

It will be apparent from the foregoing description that this invention provides a novel and very effective process for purifying or refining saturated fluorocarbons. The process is simple and easy to operate and quickly and effectively decreases the objectionable impurities to a safe low level of concentration. Thereby, the saturated fluorocarbons are obtained in a pure or substantially pure state whereby they can be used for desired purposes and handled without undue hazard to those employing and handling them. Particularly, the process produces low boiling saturated fluorocarbons, boiling below atmospheric temperatures, which are purified to such an extent that they are safe for use as propellants for food formulations. Accordingly, it will be apparent that this invention constitutes a valuable contribution to and advance in the art.

The embodiments of the invention in which an exclusive property or privilege is claimed are defined as follows:

1. The process for decreasing the impurities in a saturated fluorocarbon of 2 to 6 carbon atoms which consists of carbon and fluorine and in which the impurities consist essentially of at least one member of the group of perfluoroolefins and saturated and unsaturated halohydrocarbons which halohydrocarbons contain fluorine and at least one member of the group consisting of chlorine and hydrogen, which process comprises intimately contacting the impure saturated fluorocarbon with an aqueous solution of potassium permanganate in a concentration of from about 5% to about 40% by weight which contains from about 0.5 to about 2 parts by weight of an alkali metal hydroxide per part of potassium permanganate, at a temperature of from about 20° C. to about 95° C., employing an amount of the permanganate solution to provide from about 2 to about 6 parts by weight of potassium permanganate for each part of impurity in the saturated fluorocarbon, and separating the purified saturated fluorocarbon from the reaction mixture.

2. The process for decreasing the impurities in a saturated fluorocarbon of 2 to 6 carbon atoms which consists of carbon and fluorine and in which the impurities consist essentially of at least one member of the group of perfluoroolefins and saturated and unsaturated halohydrocarbons which halohydrocarbons contain fluorine and at least one member of the group consisting of chlorine and hydrogen, which process comprises intimately contacting the impure saturated fluorocarbon in the liquid phase with an aqueous solution of potassium permanganate in a concentration of from about 5% to about 40% by weight which contains from about 0.5 to about 2 parts by weight of an alkali metal hydroxide per part of potassium permanganate, at a temperature of from about 20° C. to about 95° C., employing an amount of the permanganate solution to provide from about 2 to about 6 parts by weight of potassium permanganate for each part of impurity in the saturated fluorocarbon, and separating the purified saturated fluorocarbon from the reaction mixture.

3. The process for decreasing the impurities in a saturated fluorocarbon of 2 to 6 carbon atoms which consists of carbon and fluorine and in which the impurities consist essentially of at least one member of the group of perfluoroolefins and saturated and unsaturated halohydrocarbons which halohydrocarbons contain fluorine and at least one member of the group consisting of chlorine and hydrogen, which process comprises intimately contacting the impure saturated fluorocarbon in the liquid phase with an aqueous solution of potassium permanganate in a concentration of from about 5% to about 10% by weight which contains about 1 part by weight of an alkali metal hydroxide per part of potassium permanganate at a temperature of about 90° C., employing an amount of the permanganate solution to provide about 4 parts by weight of potassium permanganate for each part of impurity in the saturated fluorocarbon, and separating the purified saturated fluorocarbon from the reaction mixture.

4. The process for decreasing the impurities in a saturated fluorocarbon of 2 to 6 carbon atoms which consists of carbon and fluorine and in which the impurities consist essentially of at least one member of the group of perfluoroolefins and saturated and unsaturated halohydrocarbons which halohydrocarbons contain fluorine and at least one member of the group consisting of chlorine and hydrogen, which process comprises intimately contacting the impure saturated fluorocarbon in the liquid phase with an aqueous solution of potassium permanganate in a concentration of from about 5% to about 40% by weight which contains from about 0.5 to about 2 parts by weight of an alkali metal hydroxide per part of potassium permanganate and from about 0.5% to about 1% by weight of the solution of a surface active dispersing agent, at a temperature of from about 20° C. to about 95° C., employing an amount of the permanganate solution to provide from about 2 to about 6 parts by weight of potassium permanganate for each part of impurity in the saturated fluorocarbon, and separating the purified saturated fluorocarbon from the reaction mixture.

5. The process for decreasing the impurities in a saturated fluorocarbon of 2 to 6 carbon atoms which consists of carbon and fluorine and in which the impurities consist essentially of at least one member of the group of perfluoroolefins and saturated and unsaturated halohydrocarbons which halohydrocarbons contain fluorine and at least one member of the group consisting of chlorine and hydrogen, which process comprises intimately contacting the impure saturated fluorocarbon in the liquid phase with an aqueous solution of potassium permanganate in a concentration of from about 5% to about 40% by weight which contains from about 0.5 to about 2 parts by weight of an alkali metal hydroxide per part of potassium permanganate and from about 0.5% to about 1% by weight of the solution of a dispersing agent of the group consisting of alkyl sodium sulfates and sodium alkylarenesulfonates, at a temperature of from about 20° C. to about 95° C., employing an amount of the permanganate solution to provide from about 2 to about 6 parts by weight of potassium permanganate for each part of impurity in the saturated fluorocarbon, and separating the purified saturated fluorocarbon from the reaction mixture.

6. The process for decreasing the impurities in a saturated fluorocarbon of 2 to 6 carbon atoms which consists of carbon and fluorine and in which the impurities consist essentially of at least one member of the group of perfluoroolefins and saturated and unsaturated halohydrocarbons which halohydrocarbons contain fluorine and at least one member of the group consisting of chlorine and hydrogen, which process comprises intimately contacting the impure saturated fluorocarbon in the liquid phase with an aqueous solution of potassium permanganate in a concentration of from about 5% to about 10% by weight which contains from about 0.5 to about 2 parts by weight of an alkali metal hydroxide per part of potassium permanganate and from about 0.5% to about 1% by weight of the solution of a mixture of sodium alkyl benzenesulfonates in which the alkyl groups contain an average of 12 carbon atoms, at a temperature of from about 20° C. to about 95° C., employing an amount of the permanganate solution to provide from about 2 to about 6 parts by weight of potassium permanganate for each part of impurity in the saturated fluorocarbon, and separating the purified saturated fluorocarbon from the reaction mixture.

7. The process for decreasing the impurities in octafluorocyclobutane in which the impurities consist essentially of at least one member of the group of perfluoroolefins and saturated and unsaturated halohydrocarbons which halohydrocarbons contain fluorine and at least one member of the group consisting of chlorine and hydrogen, which process comprises intimately contacting the impure octafluorocyclobutane in the liquid phase with an aqueous solution of potassium permanganate in a concentration of from about 5% to about 40% by weight which contains from about 0.5 to about 2 parts by weight of an alkali metal hydroxide per part of potassium permanganate at a temperature of from about 20° C. to about 95° C., employing an amount of the permanganate solution to provide from about 2 to about 6 parts by weight of potassium permanganate for each part of impurity in the octafluorocyclobutane, and separating the purified octafluorocyclobutane from the reaction mixture.

No references cited.